July 27, 1937. E. R. FITCH 2,088,167
FLUID PRESSURE BRAKE
Filed March 5, 1936

INVENTOR
ELLERY R. FITCH
BY Wm. M. Cady
ATTORNEY

Patented July 27, 1937

2,088,167

UNITED STATES PATENT OFFICE 2,088,167

FLUID PRESSURE BRAKE

Ellery R. Fitch, Irwin, Pa., assignor to The Westinghouse Air Brake Company, Wilmerding, Pa., a corporation of Pennsylvania Application March 5, 1936, Serial No. 67,274

27 Claims. (Cl. 303—64)

This invention relates to a fluid pressure brake and particularly to an improved brake controlling valve device.

In certain types of brake systems heretofore developed the brake controlling valve devices employed therein have included an emergency portion having valve means operated by a piston subject to the opposing pressures of the fluid in the brake pipe and of the fluid in a pressure chamber for supplying fluid under pressure to the brake cylinder and for venting fluid from the brake pipe on an emergency application of the brakes.

In the brake controlling valve devices of this type this piston also controls means for releasing fluid under pressure from the pressure chamber on a reduction in the pressure of the fluid in the brake pipe at a service rate so as to reduce the pressure of the fluid in the pressure chamber at substantially the same rate as the pressure of the fluid in the brake pipe is reduced, and thereby prevent the development of a differential in the pressures on opposite sides of the piston which would be effective to cause the piston to move the valve means to the application position.

It has been found that there is a possibility, due to high friction of the piston or of portions of the valve mechanism, or other reasons, that the piston will not move to the position to effect the release of fluid under pressure from the pressure chamber on a reduction in brake pipe pressure at a service rate, and that as a result, as the pressure in the brake pipe reduces, the difference between the pressure of the fluid in the pressure chamber and in the brake pipe will increase until the force exerted on the piston by the fluid under pressure in the pressure chamber is sufficient to overcome the resistance to movement of the piston and of the valve means. The piston and valve means controlled thereby may then be moved to the application position in which fluid is vented from the brake pipe at an emergency rate, and in which fluid under pressure is supplied to the brake cylinder, thereby producing an undesired emergency application of the brakes.

It is the principal object of this invention to provide a brake controlling valve device having an emergency portion having a piston or other movable abutment subject to the opposing pressures of the brake pipe and of a pressure chamber, and having means which is not dependent on movement of the piston or abutment for releasing fluid under pressure from the pressure chamber on a service reduction in brake pipe pressure.

A further object of the invention is to provide a brake controlling valve device of the type described having a passage controlled by the piston through which fluid under pressure may flow between the brake pipe and the pressure chamber, and having valve means associated therewith for controlling the flow of fluid through the passage, this valve means being adapted to permit fluid to flow from the pressure chamber to the brake pipe and to cut off the flow of fluid from the brake pipe to the pressure chamber.

Another object of the invention is to provide an improved brake controlling valve device of the type described and having a plurality of passages controlled by the piston through which fluid may flow between the brake pipe and the pressure chamber, one of these passages having valve means controlling the flow of fluid therethrough and being adapted to permit fluid to flow only from the pressure chamber to the brake pipe and at a given rate rapid enough to permit the pressure in the pressure chamber to reduce as rapidly as the pressure in the brake pipe is reduced on a service reduction in brake pipe pressure, another of the passages being adapted to permit fluid to flow between the brake pipe and the pressure chamber in either direction but only at a rate less rapid than is required to permit the fluid in the pressure chamber to reduce as rapidly as the pressure of the fluid in the brake pipe is reduced during a service reduction in brake pipe pressure.

A further object of the invention is to provide an improved brake controlling valve device of the type described having a plurality of passages controlled by the piston through which fluid under pressure may flow between the brake pipe and the pressure chamber, one of these passages having valve means controlling the flow of fluid therethrough and operable to permit fluid to flow from the pressure chamber to the brake pipe through said passage, and to prevent the flow of fluid from the brake pipe to the pressure chamber, another of the passages being adapted to permit fluid to flow in either direction between the pressure chamber and the brake pipe, the combined flow capacity of the passages being such as to permit fluid to flow from the pressure chamber to the brake pipe rapidly enough to reduce the pressure of the fluid in the pressure chamber substantially as rapidly as the pressure in the brake pipe is reduced on a service reduction in brake pipe pressure, but being of insufficient flow capacity to permit the pressure in the pressure chamber to reduce as rapidly as the pressure of the fluid in the brake pipe is reduced on an emergency reduction in brake pipe pressure.

Another object of the invention is to provide an improved brake controlling valve device of the type described having means controlled by the piston and adapted to permit fluid to flow from the pressure chamber to the brake pipe at a given rate rapid enough to permit the pressure of the fluid in the pressure chamber to reduce as rapidly as the pressure of the fluid in the brake pipe is reduced on a service reduction in brake pipe pressure, and being adapted to permit fluid to flow from the brake pipe to the pressure chamber only at a rate less rapid than said given rate.

Other objects of the invention and features of novelty will be apparent from the following description taken in connection with the accompanying drawing in which.

The brake controlling valve device provided by this invention is an improvement on the brake controlling valve device shown and claimed in the patent of C. C. Farmer, No. 2,031,213, and only such portions of the construction and operation of the valve device are illustrated and described in this application as are essential to the understanding of this improvement.

Referring to the drawing, the brake controlling valve device therein illustrated comprises an emergency valve portion 1, and a pipe bracket portion 2. The complete brake controlling valve device includes a service portion, not shown, which is secured to a face of the pipe bracket section 2.

The emergency portion 1, comprises a body having a bore therein in which is mounted a piston 4, having at one side thereof a chamber 6, which is constantly connected by way of a branch passage and pipe 8 with the brake pipe 10. The piston 4 has at the other side thereof a valve chamber 12, containing a main slide valve 14, and an auxiliary slide valve 16, which are operated by the piston 4 through a stem 18 which is formed integral with the piston 4.

The valve chamber 12 is constantly connected by way of a passage 15 with a pressure chamber 13 which is formed in the pipe bracket section 2.

The stem 18 has a bore in the end thereof in which is mounted a plunger 20, which is yieldingly pressed against the end of the main slide valve 14 by means of a spring 22.

The end of the valve chamber 12 is closed by means of a cover 24, and this cover has a bore therein in which is mounted a plunger 26 which is adapted to be engaged by a shoulder 28 on the piston stem 18, and by a projection 30 on the end of the main slide valve 14. The plunger 26 is yieldingly urged to the right, as viewed in Fig. 1 of the drawing, by means of a coil spring 32.

The main slide valve 14 is held in engagement with its seat by means of a strut 34, which engages one face of a diaphragm 36. The other face of the diaphragm 36 is subject to the pressure of the fluid in a chamber 38 which is constantly connected by way of a passage and pipe 40 with the emergency reservoir 42. The diaphragm 36 is also subject to the pressure of a spring 44 mounted in the chamber 38.

The body 1 has formed therein a chamber 46 in which is mounted a spillover check valve 48 which is yieldingly urged by means of a spring 50 into engagement with a seat rib 52.

The chamber 46 is constantly connected with the passage 40 and thereby with the emergency reservoir 42, while the chamber within the seat rib 52 has positioned therein a ball check valve 54 which is adapted to engage a seat formed on the casing 1 surrounding a passage 56 which communicates with the slide valve chamber 12.

The body 1 also has formed therein a chamber 60 which is constantly connected by way of a passage 62 with the brake pipe passage 8. An accelerated release check valve 64 is mounted in the chamber 60 and is yieldingly urged by means of a spring 66 into engagement with a seat rib 68, while a ball check valve 70 is mounted in the chamber within the seat rib 68 and is adapted to engage a seat formed on the body 1 surrounding a passage 72 which communicates with a port in the seat of the main slide valve 14.

The body 1 also has a bore therein in which is mounted a vent valve piston 76, having at one side thereof a chamber 78 which is constantly connected by way of a passage 80 with a port in the seat of the main slide valve 14.

The chamber on the other face of the piston 76 is open to the atmosphere by way of a passage 82, while the body 1 has a groove 84 cut therein, which, in one position of the piston 76, extends around the piston so as to permit communication between the chamber 78 and the opposite face of the piston 76.

The piston 76 has a passage 86 extending therethrough so as to permit fluid to flow from the chamber 78 to the opposite face of the piston and thence to the atmosphere by way of the passage 82. The passage 86 has a choke 88 interposed therein to restrict the rate of flow of fluid from the chamber 78.

The body 1 has secured in a groove therein a sealing gasket 90 having formed thereon an annular seat rib 92 which is adapted to be engaged by the face of the piston 76 to cut off communication from the chamber 78 around the piston 76.

The piston 76 has formed integral therewith a stem 94 which has secured thereon a valve 96 which is mounted in a chamber 97 in the body 1 and which is adapted to engage a seat rib 98 formed on the body 1. The chamber 97 in which the valve 96 is mounted is connected by way of the passage 62 with the brake pipe passage and pipe 8 and thereby with the chamber 6, while the valve 96 is yieldingly urged by means of a spring 100 into engagement with the seat rib 98.

The brake controlling valve device provided by this invention incorporates means to control the supply of fluid under pressure from the brake pipe to the valve chamber 12 and the pressure chamber 13, and to also control the release of fluid under pressure from the valve chamber 12 and pressure chamber 13. This means comprises a valve device 104, which is mounted in a chamber 106 in the body 1, which chamber is in constant communication with the valve chamber 12 and the pressure chamber 13 by way of the passage 15.

The valve device 104 is secured in a port in the wall of the bore in which the piston 4 is mounted, and in one position of the piston 4 this passage communicates with the chamber 6, and thereby with the brake pipe 10.

Figures 1, 2:
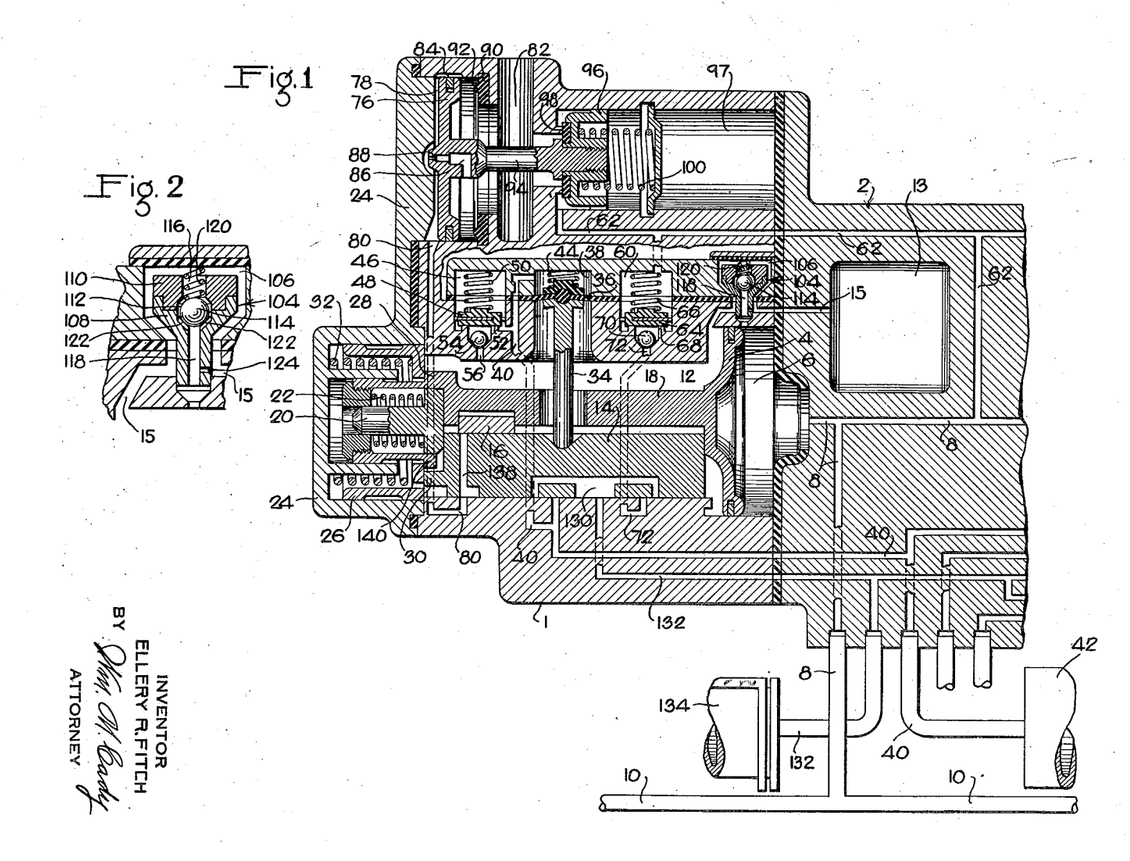
Fig. 1 is a diagrammatic view, largely in section, of a portion of a brake controlling valve device embodying this invention.
Fig. 2 is an enlarged fragmentary sectional view of a portion of the brake controlling valve device as shown in Fig. 1.

The valve device 104 comprises a pair of body sections 108 and 110 which are detachably secured together and have a chamber 112 therein in which is mounted a ball valve element 114, which is adapted to seat upon an upper seat formed on the body section 110, and surrounding a passage 116 which communicates with the chamber 106, or to seat upon a lower seat surrounding a passage 118 which communicates with the port in the wall of the piston chamber 6.

The ball valve 114 is yieldingly urged by means of a spring 120 to its lower seated position, and this seat has grooves 122 cut therein and adapted to permit fluid under pressure to flow therethrough from the pressure chamber 13 and the valve chamber 12 to the brake pipe 10 past the ball valve 114 at a given rate.

The body section 108 has a passage 124 of relatively small flow capacity formed therein and communicating with the passage 118 and with the chamber 106 in which the valve device 104 is mounted.

The brake controlling valve device is shown in the drawing in the normal release position, and in initially charging the equipment fluid under pressure supplied to the brake pipe 10 flows therefrom through the branch pipe and passage 8 to the chamber 6 on the face of the piston 4. With the piston 4 in this position communication is permitted between the chamber 6 and the passage 118 in the valve device 104 and fluid under pressure from the chamber 6 flows to the passage 118. Fluid supplied to the passage 118 flows therefrom through the passage 124 to the chamber 106 in which the valve device 104 is mounted and therefrom by way of the passage 15 to the slide valve chamber 12 and to the pressure chamber 13.

On the supply of fluid under pressure to the passage 118 the ball check valve 114 is forced upwardly against the spring 120 into engagement with its upper seat so as to cut off communication from the chamber 112 to the passage 116 and thereby prevent the flow of fluid from the passage 118 through the passage 116 to the chamber 106. Fluid therefore will be supplied from the chamber 6 on the face of the piston 4 to the pressure chamber 13 and the slide valve chamber 12 only through the relatively restricted passage 124. The pressure of the fluid in the slide valve chamber 12 and in the pressure chamber 13 will not increase as rapidly as the pressure builds up in the chamber 6 on the face of the piston 4, and because of the greater pressure in the chamber 6 acting on the face of the piston 4, the piston will be moved to the inner release position against the spring 32 acting through the plunger 26.

While the piston 4 is in the inner release position the pressure of the fluid in the slide valve chamber 12, and in the pressure chamber 13, continues to build up by the flow of fluid from the chamber 6 on the face of the piston 4.

After a time interval the pressure of the fluid in the slide valve chamber 12, and in the pressure chamber 13, will increase to a value such that the force exerted by this fluid under pressure on the piston 4, together with the force exerted on the piston 4 by the spring 32, is sufficient to overcome the opposing force exerted on the piston 4 by the fluid under pressure in the piston chamber 6. The piston 4 will thereupon move from the inner release position to the position in which it is shown in the drawing.

On movement of the piston 4 to this position the port in the wall of the bore in which the piston 4 is located remains open to the piston chamber 6 on the face of the piston 4 so that fluid under pressure supplied from the brake pipe to the piston chamber 6 continues to flow therefrom to the passage 118 from which it flows through the restricted passage 124 to the slide valve chamber 12 and the pressure chamber 13. After a time interval the pressure of the fluid in the slide valve chamber 12, and in the pressure chamber 13, will build up substantially to the pressure in the piston chamber 6, and on an increase in the pressure of the fluid in the slide valve chamber 12 substantially to this value, the ball check valve 114 is moved by the spring 120 away from the upper seated position to the lower seated position. On movement of the ball check valve 114 to the lower seated position fluid under pressure supplied to the passage 118 flows past the ball check valve 114 through the grooves 122 to the chamber 112, from which it flows through the passage 116 to the chamber 106 in which the valve device 104 is mounted, and from the chamber 106 the fluid flows to the slide valve chamber 12 and the pressure chamber 13.

On movement of the ball valve 114 away from the upper seated position, the rate of supply of fluid under pressure from the brake pipe to the slide valve chamber 12 and the pressure chamber 13 is increased, and the pressure of the fluid in these chambers will quickly equalize with the pressure in the piston chamber 6.

On an increase in the pressure of the fluid in the slide valve chamber 12, fluid under pressure flows therefrom through the passage 56 and past the ball valve 54 to the chamber within the seat rib 52. If the pressure of the fluid supplied to the chamber within the seat rib 52 exceeds by a predetermined amount the pressure of the fluid in the chamber 46, which is constantly connected by way of the passage and pipe 40 with the emergency reservoir 42, the check valve 48 will be moved against the spring 50 away from the seat rib 52, and fluid under pressure will flow past the check valve 48 to the chamber 46 and therefrom to the emergency reservoir 42.

The chamber 38 on the spring side of the diaphragm 36 is connected to the emergency reservoir 42, and on an increase in the pressure of the fluid in this reservoir there is a similar increase in the pressure in the chamber 38, thereby increasing the force exerted on the diaphragm 36 and acting through the strut 34 to hold the main slide valve 14 on its seat.

On a reduction in the pressure of the fluid in the brake pipe 10 at a service rate there will be a corresponding gradual reduction in the pressure of the fluid in the piston chamber 6, and fluid under pressure will flow thereto from the slide valve chamber 12 and the pressure chamber 13 by way of the passage 15, the chamber 106 in which the valve device 104 is mounted, passage 116 in the valve device 104, the chamber 112 and through the grooves 122 past the ball valve 114 to the passage 118 which communicates with the port in the wall of the piston chamber 6. In addition, fluid under pressure from the slide valve chamber 12 and the pressure chamber 13 may flow therefrom by way of the passage 15 and the restricted passage 124 to the passage 118 in the valve device 104, and thence to the chamber 6 on the face of the piston 4.

The flow capacity of the grooves 122 and of the restricted passage 124 are proportioned so that they permit fluid under pressure to be released from the slide valve chamber 12 and pressure chamber 13 rapidly enough to reduce the pressure in the slide valve chamber 12 and in the pressure chamber 13 substantially as rapidly as the pressure in the chamber 6 is reduced on a service application of the brakes.

As the pressures on opposite sides of the piston 4 are reduced at substantially the same rates the piston 4 will remain in the position in which it is shown in the drawing, and will not move to an application position so as to condition the valve means controlled thereby to supply fluid under pressure from the emergency reservoir 42 to the brake cylinder 134, or to operate the vent valve mechanism to release fluid under pressure from the brake pipe.

The pressure in the slide valve chamber 12 and in the pressure chamber 13 will continue to be reduced by flow of fluid therefrom to the piston chamber 6 as long as the pressure in the piston chamber 6 continues to be reduced at a rate not exceeding that which occurs during a service reduction in brake pipe pressure.

If for any reason, such as excessive leakage of fluid from the brake pipe, the pressure of the fluid in the brake pipe reduces somewhat more rapidly than normally occurs on a service reduction in brake pipe pressure, but less rapidly than takes places on an emergency reduction in brake pipe pressure, or if the pressure of the fluid in the pressure chamber 13 and the slide valve chamber 12 fails to reduce at the normal rate, so that a pressure differential is established on opposite sides of the piston 4 tending to move the piston to the application position, movement of the piston will be resisted by the spring 22 acting through the plunger 20 which is pressed against the end of the main slide valve 14. The piston 4, therefore, will not be moved relative to the main slide valve 14 unless the pressure difference in the slide valve chamber 12 and the piston chamber 6 exceeds a predetermined amount, which, in normal operation of the brake controlling valve device will not occur as long as the rate of reduction in the pressure of the fluid in the piston chamber 6 does not substantially exceed the service rate as the pressure of the fluid in the slide valve chamber 12 may reduce rapidly enough through the passages in the valve device 104 to prevent the development of this pressure difference.

On the subsequent supply of fluid under pressure to the brake pipe 10 to effect a release of the brakes, fluid flows from the brake pipe 10 through the branch pipe and passage 8 to the piston chamber 6, from which it flows through the port in the wall of the bore in which the piston 4 is mounted to the passage 118 in the valve device 104, from which it flows by way of the restricted passage 124 to the passage 15 leading to the pressure chamber 13 and the slide valve chamber 12.

Fluid supplied to the passage 118 holds the ball valve 114 in its upper seated position against the spring 120 so as to prevent the flow of fluid under pressure to the slide valve chamber 12 and pressure chamber 13 through the passage 116.

The pressure of the fluid in the slide valve chamber 12, and in the pressure chamber 13, will gradually increase by the flow of fluid thereto through the restricted passage 124 until the pressure in the slide valve chamber 12 and in the pressure chamber 13 equalizes with that in the piston chamber 6.

If the pressure of the fluid in the brake pipe 10 is reduced at an emergency rate there will be a rapid reduction in the pressure of the fluid in the chamber 6 on the face of the piston 4, and fluid under pressure cannot flow from the slide valve chamber 12 and the pressure chamber 13 through the grooves 122 and the restricted passage 124 in the valve device 104 rapidly enough to reduce the pressure of the fluid in the slide valve chamber 12 as fast as the pressure in the piston chamber 6 on the opposite face of the piston 4 is reduced.

As a result a difference in the pressures on opposite sides of the piston 4 will be developed, and when this difference has increased to a predetermined value the force exerted on the piston 4 by the fluid under pressure in the slide valve chamber 12 is sufficient to move the piston to the right, as viewed in Fig. 1 of the drawing, against the spring 22 acting through the plunger 20 which engages the end of the main slide valve 14.

On initial movement of the piston 4 relative to the main slide valve 14 the auxiliary slide valve 16 is moved relative to the main slide valve 14 so as to uncover a port 138 through the main slide valve, which in this position of the main slide valve communicates with the passage 80 leading to the chamber 78 on the face of the vent valve piston 76.

On movement of the auxiliary slide valve 16 to the position to uncover the port 138 fluid under pressure from the slide valve chamber 12 flows through the port 138 in the main slide valve 14 to the passage 80 and to the chamber 78. Fluid under pressure is supplied to the chamber 78 at a more rapid rate than it can escape therefrom through the choke 88 and also through the groove 84 around the piston 76, so that there will be a rapid increase in the pressure of the fluid in the chamber 78, and hence an increase in the force exerted by this fluid on the piston 76.

On an increase to a predetermined value in the pressure of the fluid in the chamber 78 the force exerted by this fluid on the piston 76 is sufficient to move the piston 76 to the right, as viewed in Fig. 1 of the drawing, thereby moving the vent valve 96 against the spring 100 away from the seat rib 98.

On this movement of the vent valve piston 76 the flow of fluid under pressure from the pressure chamber 78 to the atmosphere through the groove 84 is cut off, while the face of the piston 76 is pressed against the annular seat rib 92 to prevent the escape of fluid which may leak around the periphery of the piston 76.

On movement of the vent valve 96 away from the seat rib 98 fluid under pressure may flow from the brake pipe 10 and the branch pipe 8, and also from the piston chamber 6 through the passage 62 to the atmosphere by way of the passage 82 at a rapid rate.

As a result of the rapid reduction in the pressure of the fluid in the chamber 6 on the face of the piston 4 there will be an increase in the differential between the pressures in the chamber 6 and in the slide valve chamber 12 and a corresponding increase in the force exerted by the fluid under pressure in the slide valve chamber 12 on the piston 4 and tending to move the piston 4 to the application position.

As a result the piston 4 will move to the right, as viewed in Fig. 1 of the drawing, thereby compressing the spring 22, and after a predetermined amount of movement of the piston 4 relative to the main slide valve 14, a shoulder 140 on the piston stem 18 engages the end of the slide valve 14 so that on further movement of the piston 4 the main slide valve 14 is moved to the right, as viewed in Fig. 1 of the drawing, while the piston 4 moves to a position to cut off communication between the port leading to the valve device 104 and the piston chamber 6.

On movement of the piston 4 to the application position the slide valve 14 is moved to a position in which the cavity 130 therein establishes communication between the passage 40, which communicates with the emergency reservoir 42, and the passage 132 leading to the brake cylinder 134, so that fluid under pressure from the emergency reservoir 42 flows to the brake cylinder 134.

In addition, on movement of the slide valve 14 to the application position the end of the passage 80 is uncovered so as to permit fluid under pressure from the slide valve chamber 12 to continue to flow to the passage 80 and therethrough to the chamber 78 on the face of the vent valve piston 76.

Fluid under pressure supplied to the chamber 78 may escape therefrom at a restricted rate through the choke 88 and the passage 86 to the passage 82 which communicates with the atmosphere. The rate of release of fluid under pressure through the choke 88 is such, however, that the pressure of the fluid in the chamber 78 on the face of the vent valve piston 76 will not be reduced to a value low enough to permit the spring 100 to move the vent valve 96 into engagement with the seat rib 99 for a predetermined time interval which is long enough to permit fluid under pressure to escape from the brake pipe 10 and connected passages until the pressure therein is reduced to atmospheric pressure or to a relatively low value.

When the pressure of the fluid in the chamber 78 has reduced to a relatively low value the spring 100 moves the vent valve 96 to the seated position, and its movement is transmitted through the stem 94 to the vent valve piston 76, which is moved to the position in which it is shown in the drawing, in which position the groove 84 establishes communication around the piston 76.

On movement of the vent valve piston 76 to the position in which it is shown in Fig. 1 of the drawing, the fluid under pressure present in the chamber 78, in the slide valve chamber 12 and in the pressure chamber 13, is permitted to escape to the atmosphere at a rapid rate through the groove 84 around the vent valve piston 76, and these chambers, therefore, are reduced to atmospheric pressure.

On the subsequent increase in the pressure of the fluid in the brake pipe 10 for the purpose of releasing the brakes fluid under pressure supplied to the brake pipe 10 flows therefrom through the branch pipe and passage 8 to the chamber 6 on the face of the piston 4, and on an increase in the pressure of the fluid in this chamber to a predetermined value, the piston 4 is moved to the left as viewed in Fig. 1 of the drawing.

On initial movement of the piston 4, the piston, the piston stem 18 and the auxiliary slide valve 16 move relative to the main slide valve 14, this movement being assisted by the spring 22 acting through the plunger 20. On this movement of the auxiliary slide valve 16 relative to the main slide valve 14 the auxiliary slide valve 16 is moved to a position to lap the port 138 through the main slide valve. On further movement of the piston 4 the slide valve 14 is moved upon its seat, and is moved to a position in which it no longer establishes communication between the passage 40, leading from the emergency reservoir 42, and the passage 132 leading to the brake cylinder 134. In addition, on this movement of the piston 4 the slide valve 14 is moved to the position in which the port 138 therein is in alignment with the passage 80 leading to the vent valve chamber 78.

On movement of the piston 4 to the position in which it is shown in the drawing communication is permitted between the chamber 6 and the port leading to the valve device 104, and fluid under pressure supplied to the chamber 6 flows therefrom to the passage 118 from which it flows through the restricted passage 124 to the passage 15 leading to the slide valve chamber 12 and pressure chamber 13.

On the supply of fluid under pressure to the passage 118 the ball valve 114 is moved upwardly against the spring 128 to its upper seated position so as to prevent the flow of fluid to the chamber 106 through the passage 116. Fluid under pressure, therefore, will be supplied to the slide valve chamber 12 and to the pressure chamber 13 only through the restricted passage 124, and the pressure of the fluid in these chambers will increase at a slow rate.

As fluid under pressure is supplied to the slide valve chamber 12 and the pressure chamber 13 at a restricted rate, the rate of increase in the pressure of the fluid in these chambers is less rapid than the rate of increase in the chamber 6 on the opposite face of the piston 4, and there will be a gradual increase in the differential between the pressures of the fluid in the slide valve chamber 12 and in the piston chamber 6. When this differential has increased to a predetermined value the force exerted by the fluid under pressure in the piston chamber 6 on the piston 4 is sufficient to overcome the opposing force of the fluid under pressure in the slide valve chamber 12 and of the spring 32 and the piston 4 will be moved to the inner release position, thereby moving the slide valve 14 to a position in which the cavity 130 therein establishes communication between the passage 132, which leads from the brake cylinder 134, and the passage 72 leading to the accelerated release check valves 70 and 64.

When the main slide valve 14 is moved to this position fluid under pressure from the brake cylinder 134 flows therefrom through the passage 132, and the cavity 130 in the main slide valve 14, to the passage 72, past the ball check valve 70 and the check valve 64 to the chamber 60, from which it flows by way of the passage 62 to the branch pipe and passage 8 and to the brake pipe 10, thereby increasing the pressure of the fluid in this passage and in the brake pipe 10, and increasing the pressure of the fluid in the chamber 6 on the face of the piston 4.

After a time interval the pressure of the fluid in the slide valve chamber 12, and in the pressure chamber 13, will be increased by the flow of fluid thereto through the restricted passage 124 to a value such that the force exerted by the fluid under pressure in the chamber 12 acting on the face of the piston 4, together with the force exerted by the spring 32 acting through the plunger 26, is sufficient to move the piston 4 against the opposing force of the fluid under pressure in the chamber 6. When the pressure of the fluid in the slide valve chamber 12 is increased to this value the piston 4 and the main slide valve 14 will be returned to the position in which they are shown in the drawing, which is the normal release position. In this position of main slide valve 14 the cavity 130 therein no longer establishes communication between the passage 132 and passage 72 so that the flow of fluid under pressure from the brake cylinder 134 to the brake pipe is prevented.

It will be seen that the brake controlling valve device provided by this invention has valve means controlling the supply of fluid under pressure to the brake cylinder together with a movable abutment subject to the opposing pressures of the fluid in the brake pipe and in a pressure chamber for operating this valve means, and for also controlling a passage through which fluid under pressure may be supplied from the brake pipe to the pressure chamber and through which fluid may be released from the pressure chamber to the brake pipe. It will be seen also that this passage has means associated therewith and controlling the rate of flow of fluid therethrough and that this means is operative to permit fluid to flow from the brake pipe to the pressure chamber at a less rapid rate than fluid is permitted to flow from the pressure chamber to the brake pipe.

In addition, it will be seen that this brake controlling valve device incorporates valve means controlling the venting of fluid under pressure from the brake pipe, together with a movable abutment subject to the opposing pressures of the fluid in the pressure chamber and in the brake pipe for operating this valve means, and for also controlling a passage through which fluid under pressure may be released from the pressure chamber, and that resilient, yielding resisting means is provided which opposes movement of the abutment to the position to condition the valve means to vent fluid under pressure from the brake pipe and also opposes movement of the abutment to the position to cut off the release of fluid under pressure from the pressure chamber.

It will be seen further that on a reduction in the pressure of the fluid in the brake pipe at a service rate the venting of fluid under pressure from the pressure chamber to reduce the pressure of the fluid in this chamber as rapidly as the pressure of the fluid in the brake pipe is reduced takes place without any movement of the piston of the brake controlling valve device, and hence there is no possibility that the venting of fluid from the pressure chamber will fail to take place because of failure of the piston to move as a result of high friction of the piston or of portions of the valve mechanism. This prevents the possibility that a differential will be developed between the pressures in the brake pipe and in the pressure chamber which is great enough to move the piston to the application position.

In addition it will be seen that as soon as sufficient differential is created between the pressure of the fluid in the brake pipe and in the pressure chamber so as to cause the piston to move, fluid under pressure is supplied to the vent valve to operate this valve to vent fluid from the brake pipe at an emergency rate and thereby rapidly to reduce the pressure in the brake pipe and cause the piston to move to the application position. However, it will be seen that this differential will only be established when the rate of reduction in brake pipe pressure exceeds the service rate because, on a service reduction in brake pipe pressure, fluid under pressure is released from the pressure chamber to reduce the pressure of the fluid in this chamber as rapidly as the pressure of the fluid in the brake pipe is reduced.

While one embodiment of the improved brake controlling valve device provided by my invention has been illustrated and described in detail, it should be understood that the invention is not limited to these details of construction and that numerous changes and modifications may be made without departing from the scope of the following claims.

Having now described my invention, what I claim as new and desire to secure by Letters Patent, is:

1. In a fluid pressure brake equipment, in combination, a brake pipe, an emergency valve device comprising valve means operative to effect an emergency application of the brakes and a movable abutment subject to the opposing pressures of the brake pipe and of a pressure chamber for operating said valve means, said emergency valve device having a normally open passage through which fluid may flow from the pressure chamber to the brake pipe at a rate rapid enough to reduce the pressure in the pressure chamber substantially as rapidly as the pressure in the brake pipe is reduced in effecting a service application of the brakes, and a check valve for preventing back flow through said passage from the brake pipe to said chamber.

2. In a fluid pressure brake equipment, in combination, a brake pipe, an emergency valve device comprising valve means operative to effect an emergency application of the brakes and a movable abutment subject to the opposing pressures of the brake pipe and of a pressure chamber for operating said valve means, said emergency valve device having a normally open passage through which fluid may flow from the pressure chamber to the brake pipe at a rate rapid enough to reduce the pressure in the pressure chamber substantially as rapidly as the pressure in the brake pipe is reduced in effecting a service application of the brakes, a check valve for preventing back flow from the brake pipe through said passage to said chamber, and a restricted charging passage through which fluid may flow from the brake pipe to said chamber.

3. In a fluid pressure brake equipment, in combination, a brake pipe, valve means controlling the venting of fluid under pressure from the brake pipe, a movable abutment subject to the opposing pressures of the fluid in the brake pipe and of the fluid in a pressure chamber for operating said valve means and for also controlling a passage through which fluid under pressure is free to flow from the pressure chamber to the brake pipe at a rate rapid enough to reduce the pressure of the fluid in the pressure chamber substantially as rapidly as the pressure of the fluid in the brake pipe is reduced on a service reduction in brake pipe pressure, a check valve for preventing back flow of fluid under pressure from said brake pipe through said passage to said chamber, and yielding resistance means opposing movement of the abutment to operate the valve means to effect the venting of fluid from the brake pipe.

4. In a fluid pressure brake equipment, in combination, a brake pipe, valve means controlling the venting of fluid under pressure from the brake pipe, a movable abutment subject to the opposing pressures of the fluid in the brake pipe and of the fluid in a pressure chamber for operating said valve means and for also controlling a passage through which fluid under pressure is free to flow from the pressure chamber to the brake pipe at a rate rapid enough to reduce the pressure of the fluid in the pressure chamber substantially as rapidly as the pressure of the fluid in the brake pipe is reduced on a service reduction in brake pipe pressure, a check valve for preventing flow of fluid under pressure from said brake pipe through said passage to said chamber, and yielding resistance means opposing movement of the abutment in the direction to close said passage.

5. In a fluid pressure brake equipment, in combination, a brake pipe, valve means controlling the venting of fluid under pressure from the brake pipe, a movable abutment subject to the opposing pressures of the fluid in the brake pipe and of the fluid in a pressure chamber for operating said valve means and for also controlling a passage through which fluid under pressure is free to flow from the pressure chamber to the brake pipe at a rate rapid enough to reduce the pressure of the fluid in the pressure chamber substantially as rapidly as the pressure of the fluid in the brake pipe is reduced on a service reduction in brake pipe pressure, yielding resistance means opposing movement of the abutment in the direction to operate the valve means to effect the venting of fluid from the brake pipe and to close said passage, and a check valve for preventing flow of fluid under pressure from said brake pipe through said passage to said pressure chamber.

6. In a fluid pressure brake equipment, in combination, a brake pipe, a valve device operated on an increase in fluid pressure for venting fluid from the brake pipe, valve means for supplying fluid under pressure to said valve device, a movable abutment subject to the opposing pressures of the fluid in the brake pipe and of the fluid in a pressure chamber for operating the valve means and for also controlling a communication through which fluid under pressure may flow from the brake pipe to the pressure chamber at one rate and from the pressure chamber to the brake pipe at a rate more rapid than said one rate, and yielding resistance means for opposing movement of the abutment to operate the valve means to supply fluid to said valve device.

7. In a fluid pressure brake equipment, in combination, a brake pipe, a valve device operated on an increase in fluid pressure for venting fluid from the brake pipe, valve means for supplying fluid under pressure to said valve device, a movable abutment subject to the opposing pressures of the fluid in the brake pipe and of the fluid in a pressure chamber for operating the valve means and for also controlling a communication through which fluid under pressure may flow from the brake pipe to the pressure chamber at one rate and from the pressure chamber to the brake pipe at a rate more rapid than said one rate, and yielding resistance means for opposing movement of the abutment in the direction to cut off the flow of fluid from the pressure chamber to the brake pipe.

8. In a fluid pressure brake equipment, in combination, a brake pipe, a valve device operated on an increase in fluid pressure for venting fluid from the brake pipe, valve means for supplying fluid under pressure to said valve device, a movable abutment subject to the opposing pressures of the fluid in the brake pipe and of the fluid in a pressure chamber for operating the valve means and for also controlling a communication through which fluid under pressure may flow from the brake pipe to the pressure chamber at one rate and from the pressure chamber to the brake pipe at a rate more rapid than said one rate, and yielding resistance means for opposing movement of the abutment in the direction to cut off the flow of fluid from the pressure chamber to the brake pipe and to operate the valve means to supply fluid to said valve device.

9. In a fluid pressure brake equipment, in combination, a brake pipe, a valve device operated upon an increase in fluid pressure to vent fluid from the brake pipe, valve means for supplying fluid under pressure to said valve device, a movable abutment subject to the opposing pressures of the fluid in the brake pipe and of the fluid in a pressure chamber for operating the valve means and for also controlling a normally open communication through which fluid under pressure may flow from the pressure chamber to the brake pipe at a rate rapid enough to reduce the pressure of the fluid in the pressure chamber substantially as rapidly as the pressure of the fluid in the brake pipe is reduced on a service reduction in brake pipe pressure, a check valve for preventing reverse flow through said communication, and yielding resistance means opposing movement of the abutment to operate the valve means to supply fluid to said valve device.

10. In a fluid pressure brake equipment, in combination, a brake pipe, a valve device operated upon an increase in fluid pressure to vent fluid from the brake pipe, valve means for supplying fluid under pressure to said valve device, a movable abutment subject to the opposing pressures of the fluid in the brake pipe and of the fluid in a pressure chamber for operating the valve means and for also controlling a normally open communication through which fluid under pressure may flow from the pressure chamber to the brake pipe at a rate rapid enough to reduce the pressure of the fluid in the pressure chamber substantially as rapidly as the pressure of the fluid in the brake pipe is reduced on a service reduction in brake pipe pressure, a check valve for preventing reverse flow through said communication, and yielding resistance means opposing movement of the abutment in the direction to cut off the flow of fluid from the pressure chamber to the brake pipe.

11. In a fluid pressure brake equipment, in combination, a brake pipe, a valve device operated upon an increase in fluid pressure to vent fluid from the brake pipe, valve means for supplying fluid under pressure to said valve device, a movable abutment subject to the opposing pressures of the fluid in the brake pipe and of the fluid in a pressure chamber for operating the valve means and for also controlling a normally open communication through which fluid under pressure may flow from the pressure chamber to the brake pipe at a rate rapid enough to reduce the pressure of the fluid in the pressure chamber substantially as rapidly as the pressure of the fluid in the brake pipe is reduced on a service reduction in brake pipe pressure, a check valve for preventing reverse flow through said communication, and yielding resistance means opposing movement of the abutment in the direction to cut off the flow of fluid from the pressure chamber to the brake pipe and to operate the valve means to supply fluid to said valve device.

12. In a fluid pressure brake, in combination, a brake pipe, a brake controlling valve device comprising a valve device operated upon an increase in fluid pressure for venting fluid under pressure from the brake pipe, a main valve, an auxiliary valve having movement relative to the main valve, an abutment subject to the opposing pressures of the fluid in the brake pipe and of the fluid in a pressure chamber for operating said valves and for also controlling a passage through which fluid under pressure may flow from the pressure chamber to the brake pipe at a rate rapid enough to reduce the pressure of the fluid in the pressure chamber substantially as rapidly as the pressure of the fluid in the brake pipe is reduced on a service reduction in brake pipe pressure, a check valve for preventing flow of fluid under pressure from said brake pipe through said passage to said chamber, means controlled by the auxiliary valve and operated on movement of said auxiliary valve relative to the main valve for supplying fluid under pressure to said valve device, and yielding resistance means for opposing movement of the auxiliary valve relative to the main valve.

13. In a fluid pressure brake, in combination, a brake pipe, a brake controlling valve device comprising a valve device operated upon an increase in fluid pressure for venting fluid under pressure from the brake pipe, a main valve, an auxiliary valve having movement relative to the main valve, an abutment subject to the opposing pressures of the fluid in the brake pipe and of the fluid in a pressure chamber for operating said valves and for also controlling a passage through which fluid under pressure may flow from the pressure chamber to the brake pipe at a rate rapid enough to reduce the pressure of the fluid in the pressure chamber substantially as rapidly as the pressure of the fluid in the brake pipe is reduced on a service reduction in brake pipe pressure, a check valve for preventing flow of fluid under pressure from said brake pipe through said passage to said chamber, means controlled by the auxiliary valve and operated on movement of said auxiliary valve relative to the main valve for supplying fluid under pressure to said valve device, and yielding resistance means for opposing movement of the abutment in the direction to cut off the flow of fluid from the pressure chamber to the brake pipe.

14. In a fluid pressure brake, in combination, a brake pipe, a brake controlling valve device comprising a valve device operated upon an increase in fluid pressure for venting fluid under pressure from the brake pipe, a main valve, an auxiliary valve having movement relative to the main valve, an abutment subject to the opposing pressures of the fluid in the brake pipe and of the fluid in a pressure chamber for operating said valves and for also controlling a passage through which fluid under pressure may flow from the pressure chamber to the brake pipe at a rate rapid enough to reduce the pressure of the fluid in the pressure chamber substantially as rapidly as the pressure of the fluid in the brake pipe is reduced on a service reduction in brake pipe pressure, a check valve for preventing flow of fluid under pressure from said brake pipe through said passage to said chamber, means controlled by the auxiliary valve and operated on movement of said auxiliary valve relative to the main valve for supplying fluid under pressure to said valve device, and yielding resistance means for opposing movement of the auxiliary valve relative to the main valve and for also opposing movement of the abutment in the direction to cut off the flow of fluid from the pressure chamber to the brake pipe.

15. In a fluid pressure brake, in combination, a brake pipe, a brake controlling valve device comprising a main valve, an auxiliary valve having movement relative to the main valve, means controlled by the auxiliary valve and operated on movement of the auxiliary valve relative to the main valve for venting fluid from the brake pipe, an abutment subject to the opposing pressures of the fluid in the brake pipe and of the fluid in a pressure chamber for operating said valves and for also controlling a passage through which fluid under pressure may flow from the pressure chamber to the brake pipe at a rate rapid enough to permit the pressure of the fluid in the pressure chamber to be reduced substantially as rapidly as the pressure of the fluid in the brake pipe is reduced on a service reduction in brake pipe pressure, a check valve in said passage for preventing flow of fluid under pressure from said brake pipe through said passage to said chamber, said abutment also controlling another passage through which fluid under pressure is adapted to flow from said brake pipe to said pressure chamber, and yielding resistance means for opposing movement of the auxiliary valve relative to the main valve.

16. In a fluid pressure brake, in combination, a brake pipe, a brake controlling valve device comprising a main valve, an auxiliary valve having movement relative to the main valve, means controlled by the auxiliary valve and operated on movement of the auxiliary valve relative to the main valve for venting fluid from the brake pipe, an abutment subject to the opposing pressures of the fluid in the brake pipe and of the fluid in a pressure chamber for operating said valves and for also controlling a passage through which fluid under pressure may flow from the pressure chamber to the brake pipe at a rate rapid enough to permit the pressure of the fluid in the pressure chamber to be reduced substantially as rapidly as the pressure of the fluid in the brake pipe is reduced on a service reduction in brake pipe pressure, a check valve in said passage for preventing flow of fluid under pressure from said brake pipe through said passage to said chamber, said abutment also controlling another passage through which fluid under pressure is adapted to flow from said brake pipe to said pressure chamber, and yielding resistance means for opposing movement of the auxiliary valve relative to the main valve and for also opposing movement of the abutment in the direction to close said passage.

17. In a fluid pressure brake, in combination, a brake pipe, a brake controlling valve device comprising a main valve, an auxiliary valve having movement relative to the main valve, means controlled by the auxiliary valve and operated by movement of the auxiliary valve relative to the main valve for venting fluid from the brake pipe, a movable abutment subject to the opposing pressures of the fluid in the brake pipe and of the fluid in a pressure chamber for operating said valves and for also controlling charging means adapted to permit fluid to flow from the brake pipe to the pressure chamber at one rate and to flow from the pressure chamber to the brake pipe at a more rapid rate.

18. In a fluid pressure brake, in combination, a brake pipe, a brake controlling valve device comprising a main valve, an auxiliary valve having movement relative to the main valve, means controlled by the auxiliary valve and operated by movement of the auxiliary valve relative to the main valve for venting fluid from the brake pipe, a movable abutment subject to the opposing pressures of the fluid in the brake pipe and of the fluid in a pressure chamber for operating said valves and for also controlling charging means adapted to permit fluid to flow from the brake pipe to the pressure chamber at one rate and to flow from the pressure chamber to the brake pipe at a more rapid rate, and yielding resistance means for opposing movement of the auxiliary valve relative to the main valve.

19. In a fluid pressure brake, in combination, a brake pipe, a pressure chamber, valve means for supplying fluid under pressure to the brake cylinder, a movable abutment subject to the opposing pressures of the fluid in the brake pipe and of the fluid in a pressure chamber for operating the valve means, a passage controlled by said abutment through which a normally open communication is established between the brake pipe and the pressure chamber, and valve mechanism subject to the opposing pressures of the fluid in the brake pipe and of the fluid in the pressure chamber for controlling communication through said passage, said valve mechanism being operative to permit fluid to flow from the pressure chamber to the brake pipe and to cut off the flow of fluid from the brake pipe to the pressure chamber.

20. In a fluid pressure brake, in combination, a brake pipe, a pressure chamber, valve means for supplying fluid under pressure to the brake cylinder, a movable abutment subject to the opposing pressures of the fluid in the brake pipe and of the fluid in a pressure chamber for operating the valve means, a passage controlled by said abutment through which a normally open communication is established between the brake pipe and the pressure chamber, valve mechanism subject to the opposing pressures of the fluid in the brake pipe and of the fluid in the pressure chamber for controlling communication through said passage, said valve mechanism being operative to permit fluid to flow from the pressure chamber to the brake pipe at a given rate and to prevent the flow of fluid from the brake pipe to the pressure chamber, and a by-pass passage extending around the valve mechanism and adapted to permit fluid to flow from the brake pipe to the pressure chamber at a rate less rapid than said given rate.

21. In a fluid pressure brake, in combination, a brake pipe, a pressure chamber, valve means for supplying fluid under pressure to the brake cylinder, a movable abutment subject to the opposing pressures of the fluid in the brake pipe and of the fluid in a pressure chamber for operating the valve means, a plurality of passages controlled by the abutment through which fluid under pressure is normally free to flow between the brake pipe and the pressure chamber, one of said passages having a valve device associated therewith and operable to permit fluid to flow from the pressure chamber to the brake pipe and to prevent the flow of fluid from the brake pipe to the pressure chamber through said passage.

22. In a fluid pressure brake, in combination, a brake cylinder, a brake pipe, valve means controlling the supply of fluid under pressure to the brake cylinder and also controlling a communication through which fluid under pressure may be supplied from the brake cylinder to the brake pipe, movable abutment means subject to the opposing pressures of the fluid in the brake pipe and of the fluid in a pressure chamber for controlling said valve means and for also controlling means through which fluid under pressure may flow from the pressure chamber to the brake pipe at a given rate and through which fluid may flow from the brake pipe to the pressure chamber at a rate less rapid than said given rate, the abutment being operated upon an increase in the pressure of the fluid in the brake pipe to a predetermined value above that in the pressure chamber to move the valve means to permit the flow of fluid from the brake cylinder to the brake pipe.

23. In a fluid pressure brake, in combination, a brake cylinder, a brake pipe, valve means controlling the supply of fluid under pressure to the brake cylinder and also controlling a communication through which fluid under pressure may be supplied from the brake cylinder to the brake pipe, movable abutment means subject to the opposing pressures of the fluid in the brake pipe and of the fluid in a pressure chamber for controlling said valve means and for also controlling means through which fluid may flow from the pressure chamber to the brake pipe at a given rate and through which fluid may flow from the brake pipe to the pressure chamber at a rate less rapid than said given rate, the abutment being operated upon an increase in the pressure of the fluid in the brake pipe to a predetermined value above that in the pressure chamber to move the valve means to the position to permit the flow of fluid from the brake cylinder to the brake pipe, and resilient means opposing operation of the abutment to move the valve means to said position.

24. In a fluid pressure brake, in combination, a brake cylinder, a brake pipe, valve means for supplying fluid under pressure to the brake cylinder, movable abutment means subject to the opposing pressures of the fluid in the brake pipe and of the fluid in a pressure chamber for controlling said valve means and for also controlling a passage through which fluid under pressure may flow from the pressure chamber to the brake pipe, a valve controlling communication through said passage, said valve being movable between a position to prevent the flow of fluid from the brake pipe to the pressure chamber and a position in which it permits the flow of fluid from the pressure chamber to the brake pipe, and resilient means yieldingly urging said valve to the position to permit fluid to flow through said passage.

25. In a fluid pressure brake, in combination, a brake cylinder, a brake pipe, valve means for supplying fluid under pressure to the brake cylinder, movable abutment means subject to the opposing pressures of the fluid in the brake pipe and of the fluid in a pressure chamber for controlling said valve means and for also controlling a passage through which fluid under pressure may flow from the pressure chamber to the brake pipe, a valve controlling communication through said passage, said valve being movable between a position to prevent the flow of fluid from the brake pipe to the pressure chamber and a position in which it permits the flow of fluid from the pressure chamber to the brake pipe, resilient means yieldingly urging said valve to the position to permit fluid to flow through said passage, and a passage by-passing said valve through which fluid may flow from the brake pipe to the pressure chamber at a restricted rate.

26. In a fluid pressure brake, in combination, a brake cylinder, a brake pipe, valve means for supplying fluid under pressure to the brake cylinder, movable abutment means subject to the opposing pressures of the fluid in the brake pipe and of the fluid in a pressure chamber for controlling said valve means and for also controlling a passage through which fluid under pressure may flow between the brake pipe and the pressure chamber at one rate, another passage controlled by said abutment through which fluid under pressure may flow from the pressure chamber to the brake pipe at a rate more rapid than said one rate, a valve controlling communication through said other passage, and resilient means yieldingly urging said valve to a position to permit communication through said passage.

27. In a fluid pressure brake, in combination, a brake cylinder, a brake pipe, valve means controlling the supply of fluid under pressure to the brake cylinder and controlling a passage through which fluid under pressure may be supplied from the brake cylinder to the brake pipe, a movable abutment subject to the opposing pressures of the fluid in the brake pipe and of the fluid in a pressure chamber for operating the valve means and for also controlling a passage through which fluid may flow from the brake pipe to the pressure chamber at a restricted rate and another passage through which fluid may flow from the pressure chamber to the brake pipe, a valve controlling communication through the last named passage and operative to prevent the flow of fluid from the brake pipe to the pressure chamber, the abutment being operated upon an increase in the pressure of the fluid in the brake pipe to a value above the pressure in the pressure chamber to permit communication through the passages controlled thereby and to move the valve means to a position to establish communication through the passage through which fluid may flow from the brake cylinder to the brake pipe.

ELLERY R. FITCH.